United States Patent [19]

Havens et al.

[11] Patent Number: 4,979,976
[45] Date of Patent: Dec. 25, 1990

[54] MAKING COLORED PHOTOCHROMIC GLASSES

[75] Inventors: Thomas G. Havens, Painted Post; David J. Kerko, Corning, both of N.Y.

[73] Assignee: Corning Incorporated, Corning, N.Y.

[21] Appl. No.: 509,350

[22] Filed: Apr. 16, 1990

[51] Int. Cl.$^5$ ............................................... C03C 4/06
[52] U.S. Cl. ................................... 65/30.11; 65/32.3; 501/13
[58] Field of Search ................. 65/30.11, 32.3; 501/13

[56] References Cited

U.S. PATENT DOCUMENTS

| | | | |
|---|---|---|---|
| 3,920,463 | 11/1975 | Simms | 65/30.11 X |
| 4,240,836 | 12/1980 | Borrelli et al. | 65/32.3 X |
| 4,498,919 | 2/1985 | Mann | 65/30.11 |
| 4,832,724 | 5/1989 | Borrelli et al. | 65/30.11 |

Primary Examiner—Robert L. Lindsay
Attorney, Agent, or Firm—Clinton S. Janes, Jr.

[57] ABSTRACT

This invention is directed to a method for making tinted photochromic glass articles having an integral reduced surface layer exhibiting color, the glass utilizing silver halide crystals as the photochromic agent. The method generally comprises heat treating the glass article in a heating chamber in an atmosphere of flowing hydrogen at temperatures below 500° C. The specific steps of the inventive method comprise:

(a) initially flowing hydrogen gas into said heat treating chamber at a sufficiently rapid rate to essentially instantaneously fill said chamber with the gas;

(b) immediately thereafter decreasing the flow of said the hydrogen gas to permit careful control of the rate at which reduction takes place in the glass surface; and (c) continuing that gas flow for a sufficient length of time to produce an integral reduced surface layer on both front and back surfaces of the article having a combined depth effective to exhibit a color, but not of such individual depth as to prevent the passage of ultraviolet radiation through the front surface of the article.

7 Claims, No Drawings

MAKING COLORED PHOTOCHROMIC GLASSES

BACKGROUND OF THE INVENTION

Inorganic photochromic glasses had their genesis in U. S. Pat. No. 3,208,860 (Armistead et al.). That patent provided many examples of silicate-based glasses containing silver halide crystals, viz., crystals of AgCl, AgBr, and/or AgI which imparted the reversibly darkening phenomenon to those glasses. The preferred base glass compositions were stated to be encompassed within the alkali metal aluminoborosilicate system. Numerous patents describing photochromic glasses having compositions outside of that preferred base composition system have issued, but yet today the most widely marketed photochromic glass products are prepared from compositions included within that base system.

Various transition metal oxides, such as CoO, $Cr_2O_3$, CuO, $Fe_2O_3$, NiO, MnO, and $V_2O_5$, and rare earth metal oxides, such as $Er_2O_3$, Pd, and $Pr_2O_3$, have been incorporated into the base composition to impart colors of different shades thereto. Photochromic ophthalmic lenses tinted by that means are currently available commercially. For example, U. S. Pat. No. 4,251,278 (Hares) discloses silver halide-containing photochromic glasses wherein about 1-10 ppm Pd and/or Au are included to impart a warm brown coloration to the glass. Such glasses are marketed by Corning Incorporated, Corning, N.Y. under the trademark PHOTOBROWN EXTRA. Nevertheless, because of the inherent complexities in precisely controlling the level of addition of such colorants to assure homogeneous coloration and uniform coloring from piece-to-piece and melt-to-melt, coupled with critical regulation of the redox conditions during melting and forming of the glass and the hazard that the coloring agent may adversely affect the photochromic behavior of the glass, methods were devised for conferring color to the glass without utilizing additions of coloring agents.

U. S. Pat. No. 3,891,582 (Simms) discloses exposing photochromic glass articles having compositions encompassed with Pat. No. 3,208,860, supra, to a reducing atmosphere, referring specifically to hydrogen atmospheres, for periods of time ranging from about 15 minutes at 300° C. to about 4-5 minutes at 600° C. Strict compliance with those heat treating parameters is insisted upon; otherwise, the desired photochromic behavior will be lost and/or the oxides in the base glass compositions will be reduced.

U. S. Pat. No. 4,240,836 (Borrelli et al.) describes a method for producing surface colored photochromic glasses which, in the undarkened state in transmitted light, exhibit red and purple coloration or mixtures of orange, red, purple and/or blue colors. The method contemplated subjecting silver halide-containing photochromic glasses to a specified heat treatment under reducing conditions. Thus, as is stated in the patent, the inventive method comprised heat treating a silver halide-containing photochromic glass under reducing conditions at a temperature not exceeding about 450° C. for a period of time sufficient to generate specific visible light absorption characteristics in the glasses. Generally, temperatures between 200°-450° C. were operable, with 350°-450° C. being preferred. As is explained there, those characteristics are such that, following the reduction heat treatment, the glass demonstrates in the undarkened state, a spectral transmittance curve comprising at least one treatment-induced absorption peak having a location and intensity such that the peak falls within the spectral transmittance region to the right of line CB in FIG. 1 of the drawings. The peak is not present in the parent photochromic glass from which the surface-colored article is made. Hence, in a surface colored glass, the surface color differs from the color of the bulk glass (if the bulk glass is colored), a condition which can be determined readily be comparing the spectral transmittance characteristics of the article before and after the removal of a small amount of surface glass therefrom.

Borrelli et al. hypothesized that the surface coloration effects were caused by the chemical reduction of silver in contact with silver halide microcrystals in a region very close to the surface of the glass article, with the color being determined by the geometric form and arrangement of metallic silver on those microcrystals. That hypothesis was supported through experiments demonstrating that, using a given reduction heat treatment, a particular photochromic glass can display any of a number of absorption peaks depending upon the process originally used to develop the silver halide microcrystals in the glass.

Borrelli et al. referred to two composition areas of photochromic glasses especially useful in their coloration method. The first composition area was disclosed in U.S. Pat. No. 4,190,451 (Hares et al.), those glasses consisting essentially, in weight percent, of about 0-2.5% $Li_2O$, 0-9% $Na_2$, 0-17% $K_2O$, 0-6% $Cs_2O$, 8-20% $Li_2O+Na_2O+K_2O+Cs_2O$, 14-23% $B_2O_3$, 5-25% $Al_2O_3$, 0-25% $P_2O_5$, 20-65% $SiO_2$, 0.004-0.02% CuO, 0.15-0.3% Ag, 0.1-0.25% Cl, and 0.1-0.2% Br, wherein the molar ratio of alkali metal oxides:$B_2O_3$ ranges about 0.55-0.85 and the weight ratio Ag:(Cl+Br) ranges about 0.65-0.95. The patentees also noted that the glasses may also contain up to about 10%% total of optional components, expressly mentioning 0-6% $ZrO_2$, 0-3% $TiO_2$, 0-0.5% PbO, 0-7% BaO, 0-4% CaO, 0-3% MgO, 0-6% $Nb_2O_5$, 0-4% $La_2O_3$, and 0-2% F. Hares et al. further observed that up to 1% total of transition metal oxide colorants and/or up to 5% total of rare earth metal oxide colorants could be included without deleteriously affecting the photochromic properties of the glass.

The second composition area was disclosed in U.S. Pat. No. 4,018,965 (Kerko et al.), those glasses consisting essentially, in weight percent, of about 57.1-65.3% $SiO_2$, 9.6-13.9% $Al_2O_3$, 12.0-22.0% $B_2O_3$, 1.0-3.5% $Li_2O$, 3.7-12.0% $Na_2O$, 0-5.8% $K_2O$, 6-15% $Li_2O+Na_2O+K_2O$, a weight ratio $Li_2O$:($Na_2O+K_2O$) not exceeding about 2:3, 0.7-3.0% PbO, 0.1-1.0% Ag, 0.15-1.0% Cl, 0-3.0% Br, 0-2.5% F, 0.008-0.12% CuO, 0-1% total transition metal oxide colorants, and 0-5% total rare earth metal oxide colorants. Again, the colorants did not adversely affect the photochromic behavior of the glasses.

Further disclosures illustrating the imparting of color to a silver halide-containing photochromic glass through heat treatment in a reducing environment are provided in U.S. Pat. No. 4,259,406 (Borrelli), U.S. Pat. No. 4,290,794 (Wedding), U.S. Pat. No. 4,537,612 (Borrelli et al.), and U.S. Pat. No. 4,832,724 (Borrelli et al.)

U.S. Pat. No. 4,259,406 describes a process for providing colors in selected areas of a silver halide-containing, photochromic glass article, e.g., an ophthalmic lens, by first heat treating the article in a reducing environment to provide a desired tint over the entire surface of the article, and thereafter chemically removing the surface tint in selected areas of the article. The process also lends itself to produce a gradient tinting effect on the article.

U.S. Pat. No. 4,290,794 is directed to a two-step, heat treating process for producing different shades of yellow and orange in silver halide-containing, photochromic glass articles wherein the composition of the glass also contains lead. The articles are first least treated in a reducing environment at a temperature below the strain point of the glass to cause silver ions in the glass surface to be reduced to metallic silver. Subsequently, the articles are heat treated in a reducing atmosphere at a temperature above the strain point and up to 50° C above the annealing point of the glass in order to cause the reduction of lead ions in the glass surface to metallic lead particles as a layer over the metallic silver particles.

U.S. Pat. No. 4,537,612 is drawn to a method for varying the color exhibited by a silver halide-containing photochromic glass imparted to the glass via the reduction heat treatment described in U.S. Pat. No. 4,240,836, supra, wherein the composition of the glass also contains $Li^+$ ion and, optionally, $K^+$ ions. Thus, the inventive method comprised subjecting the glass to an ion exchange reaction at a temperature below the strain point of the glass wherein $Na^+$ ions from an external source are exchanged with $Li^+$ ions and, if also present, $K^+$ ions in the surface of the glass prior to the reduction heat treatment.

U.S. Pat. No. 4,832,724 discloses a two-step process for conferring color to the surface of a silver halide-containing photochromic glass wherein the composition of the glass also contains alkali metal ions. The process consists of subjecting the glass to an ion exchange reaction at a temperature below the strain point of the glass wherein $Ag^+$ ions from an external source are exchanged with alkali metal ions in the surface of the glass. Thereafter, the glass is exposed to the reduction heat treatment described in U.S. Pat. No. 4,240,836.

The greatest commercial application for photochromic glasses to date has been in the production of eyeglasses, i.e., in prescription and non-description lenses. In the case of eyeglasses to be worn in bright sunlight (sunglasses), the wearer has generally requested a glass having a particularly desirable color tint in the undarkened state, which tint does not charge markedly as the glass darkens to a very low visible transmittance upon exposure to sunlight. Depending upon the density of the tint, the visible transmittance of the glass in the undarkened state may be reduced to a value of 50% or less so that, upon exposure to sunlight, the darkened transmittance of the glass may be 20% or less.

For example, Corning Incorporated, Corning, N.Y. markets a photochromic glass as Corning Code 8155 which, after being subjected to the reducing heat treatment described in U.S. Pat. No. 4,240,836, supra, exhibits a pleasing copper brown tint and a visible transmittance in the undarkened state of about 45%. When exposed to sunlight, the tint deepens somewhat and the visible transmittance is reduced to about 15%. That glass as prescription SERENGETI ® Driver photochromic sunglass is especially favored by automobile race drivers and has a composition included within U.S. Pat. No. 4,190,451, supra. Thus, the glass has the following approximate composition, expressed in terms of parts by weight. Inasmuch as the sum of the listed components closely approaches 100, for all practical purposes the values reported may be deemed to represent weight percent.

| | | | | | |
|---|---|---|---|---|---|
| $SiO_2$ | 56.46 | $Li_2O$ | 1.81 | Br | 0.169 |
| $B_2O_3$ | 18.15 | $ZrO_2$ | 4.99 | CuO | 0.0068 |
| $Al_2O_3$ | 6.19 | $TiO_2$ | 2.07 | NiO | 0.120 |
| $Na_2O$ | 5.52 | Ag | 0.254 | CoO | 0.0239 |
| $K_2O$ | 5.72 | Cl | 0.210 | | |

In the commercial production of the SERENGETI ® Driver lenses, the reduction heat treatment is carried out as a batch process. Hence, a group of lens blanks will be placed in a furnace, kiln, or rather heating chamber equipped with means to feed in a flowing reducing atmosphere (usually hydrogen), and a flue for flaming off the flowing hydrogen after it passes among the lens blanks. In order to assure a reduced surface layer of uniform thickness, thereby assuring a tint which visually appears to be uniform across the lens, the lenses are exposed for a relatively long period of time. That practice, however, has resulted in the need for a process termed "front siding." Front siding is the removal of about 0.1–0.2 mm from the convex (front) side of a lens through grinding and polishing. This removal is necessary because the reduced surface layer (metallic silver and, if present, lead) absorbs ultraviolet radiation, thereby inhibiting photochromism.

In the case of conventional multifocal lenses, front siding is required for a second purpose. The higher refractive index segment or button glasses currently used in multifocal photochromic lenses are of a different composition from the major portion of the lenses and are not photochromic. They are not colored in the reduction heat treatment process. Front siding removes the ultraviolet absorbing layer from the major portion of the lens and allows the non-colored, non-photochromic segment to blend in cosmetically.

A rather recent development in the field of ophthalmic multifocal lenses has been the design of a progressive power lens. That lens utilizes a blending of curvatures on the convex side, thereby creating a gradual increase in plus power. Such design contrasts with the conventional multifocal lens described above wherein a segment glass exhibiting a higher refractive index than the major portion is sealed to the major portion to achieve the desired power. The progressive power lens has been deemed to be more cosmetically pleasing than the conventional multifocal lens, because there is no apparent sharp outline between the major portion and the higher power portion. As a consequence, this style of lens has seen a rapid growth in popularity.

As can be recognized immediately, progressive power lenses cannot be subjected to front siding; the curvatures designed into the convex side cf the lens would quite obviously be affected.

To summarize, not only is front siding a time-consuming and expensive process which adds substantially to the cost of the lenses, but also that technique cannot be applied to progressive power lenses. Therefore, the primary objective of the present method was to devise a process for producing heat treated, tinted photochromic glass articles which would not require the step of front siding and which would also be effective for use with progressive power lenses. A specific objective was to devise means for preparing SERENGETI ® Driver photochromic sunglass lenses without the need for front siding.

SUMMARY OF THE INVENTION

An atmosphere of flowing hydrogen has been found to be the most effective and efficient environment for the reduction heat treatment of silver halide-containing photochromic glasses to generate surface tints therein. Nevertheless, as can be appreciated, the flaming off of the hydrogen gas as it leaves the kiln is inherently hazardous. Therefore, to minimize that hazard in commercial operations, the flow of hydrogen through the kiln has been held at very modest levels, typically at no more than about 5 ft$^3$/hour in the heat treating chambers used. That practice, however, has necessitated long exposure periods to assure the development of a reduced surface layer of sufficient thickness over the entire article to confer a uniform tint thereto. Thus, the slow flow rate of the hydrogen gas does not provide equal exposure of the various areas of the glass articles until hydrogen gas equilibrium is reached within the heating chamber. Consequently, certain regions of the glass articles have thicker reduced surface layers than others. Accordingly, to assure that the front surface of a glass article, e.g., the convex side of an ophthalmic lens, will permit the passage therethrough of sufficient ultraviolet radiation to render the article uniformly photochromic, front siding has been employed.

Laboratory experimentation demonstrated that the depth of the reduced surface layer actually effective to impart the desired tint to a glass article was very thin, i.e., less than about 0.003" ($\approx$0.075 mm), and generally in the range of about 0.0005–0.0025"($\approx$0.013–0.063 mm). And such experimentation indicated that such thin surface layers did not substantially block the passage of ultraviolet radiation therethrough; the glass articles exhibited good photochromic behavior. However, because of the unevenness in the thickness of the reduced surface layer produced via the commercial process, coupled with the inability of the standard grinding and polishing facilities available to the lens maker to produce fine tolerances, about 0.1–0.2 mm is customarily removed in front siding.

Our invention is based upon the hypothesis that, if hydrogen gas equilibrium within the heating chamber could be attained essentially instantaneously, three vital advantages would result:

(1) the thickness of a reduced surface layer could be made virtually constant over the entire area of the article; thereby making possible
(2) the precise control of the depth of a reduced surface; and, in view of that circumstance,
(3) the depth of a reduced surface layer could be so controlled as to be sufficiently thin on the front surface of the article to permit the passage of ultraviolet radiation therethrough but, because both the front and back surfaces of the article would be tinted, the combined thicknesses of the reduced surface layers would be sufficient to generate the desired tint.

(A fourth apparent advantage inherent in the invention would be to significantly decrease the time for completing the reduction heat treatment.)

Our experimentation proved out the validity of that hypothesis. Thus, our invention comprises exposing the glass articles (in our experiments ground and polished photochromic ophthalmic lens blanks) within the heat treating kiln to a surge of flowing hydrogen gas of sufficient magnitude and force to fill the heat treating chamber essentially instantaneously (nc more than a few seconds), but then immediately reducing the flow to avoid hazardous flame off, to avert a cooling effect in the heating chamber, and to slow the rate of surface reduction. The flow of hydrogen gas is thereafter continued at the relatively low level to complete the reduction treatment in a controlled manner.

In essence then, our invention comprises an improvement upon the disclosure of U.S. Pat. No. 4,240,836 wherein hydrogen gas is initially flowed into the heat treating chamber at a sufficiently rapid rate to essentially instantaneously fill the chamber with hydrogen gas and thereafter the flow rate is decreased to permit careful control of the rate at which reduction takes place in the glass surface. That flow is continued for a sufficient length of time to produce an integral reduced surface layer on both the front and back surfaces of the article of adequate combined depth to exhibit a desired permanent coloration, but not of such individual thickness as to prevent the passage of ultraviolet radiation through the front surface. As will be demonstrated hereinafter, whereas the temperature of heat treatment will commonly be held below 450° C., the inventive method is operable at temperatures up to about 500° C.

As has been explained above, hydrogen gas constitutes the most effective and efficient agent for producing the desired reduced surface layer on the glass. Preferably, then, an atmosphere of essentially pure hydrogen gas will be employed to secure the most rapid surface reaction. However, blends of hydrogen with relatively small amounts of a non-oxidizing gas, for example, nitrogen, may be utilized. Such blends will, quite apparently, decrease the rate of surface reaction, the decrease in rate being dependent upon the proportion of non-oxidizing gas present. Accordingly, when the term hydrogen gas is used, such term will be deemed to include such blends.

DESCRIPTION OF PREFERRED EMBODIMENTS

Example I reflects the standard commercial procedure in hydrogen firing silver halide-containing photochromic glasses to generate a tinted surface layer therein.

EXAMPLE I

A group of ground and polished prescription lenses having center thicknesses of about 2.2 mm prepared from Corning Code 8155 glass was placed in an electrically-heated kiln and the temperature therein raised to about 388° C. After purging the air atmosphere within the kiln with flowing nitrogen, hydrogen gas was passed therein at a flow 15 rate of about 5 ft$^3$/hour. After about 40 minutes, the flow of hydrogen was cut off and the atmosphere within the kiln purged with flowing nitrogen. The lenses were removed from the kiln and allowed to further cool to room temperature in the ambient environment. When exposed to ultraviolet radiation, photochromism was virtually absent. The convex side of each lens was then front sided.

Example II illustrates the reduction heat treatment practice of our invention.

EXAMPLE II

A group of ground and polished prescription lenses having center thicknesses varying from 2 mm to 7 mm, depending upon the power of the lens, fashioned from Corning Code 8155 glass was placed in an electrically-heated kiln and the temperature raised therein to about 388° C. After purging the air atmosphere within the kiln with flowing nitrogen, hydrogen gas was surged into the kiln at a rate of about 20 ft³/hour for about 5 seconds, after which the flow was sharply cut back to about 5 ft³/hour and that flow maintained for about 9 minutes and 55 seconds. Thereafter, the flow of hydrogen was cut off and the hydrogen in the atmosphere therein purged with nitrogen. After withdrawal from the heating chamber and cooling to room temperature, the lenses demonstrated photochromic behavior when exposed to ultraviolet radiation.

Undarkened color and photochromic properties were determined on both sets of lens blanks utilizing a conventional tristimulus colorimeter and laboratory exposure/photometer system. Each sample was exposed for 15 minutes at 25° C. to the solar simulator apparatus described in U.S. Pat. No. 4,125,775 (Chodak), and then removed from the solar simulator for five minutes. Table I reports the average luminous transmittance expressed in terms of percent exhibited by each group of samples before darkening ($T_o$), after darkening for 15 minutes ($T_{D15}$), after fading for five minutes ($T_{F5}$), and the amount of fading in terms of percentage points ($T_{F5}$-$T_{D15}$). Table I also lists the average chromaticity coordinates (x,y) of the undarkened specimens utilizing Illuminant C.

TABLE I

|  | Example I | Example II |
| --- | --- | --- |
| $T_o$ | 44.6 | 44.8 |
| $T_{D15}$ | 13.4 | 15.0 |
| $T_{F5}$ | 34.2 | 34.8 |
| $T_{F5}$-$T_{D15}$ | 20.8 | 19.8 |
| x | 0.3784 | 0.3762 |
| y | 0.3398 | 0.3359 |

It is immediately evident that both the color and the photochromic characteristics of the two groups of samples are so very similar as to appear identical to the eye. Yet, the inventive short firing schedule is quite apparently advantageous from a practical point of view in that the expense of kiln time is sharply reduced and the need for the added expensive step of front siding is eliminated.

Corning Incorporated also markets a yellow tinted silver halide-containing photochromic glass under the trademark CPF 450 which is prepared by hydrogen firing Corning Code 8122 glass at a temperature of about 475° C. That glass, having the approximate composition below expressed in terms of parts by weight, is included within U.S. Pat. No. 4,251,278, supra.

| SiO₂ | 56.3 | TiO₂ | 2.2 | Ag | 0.21 |
| --- | --- | --- | --- | --- | --- |
| B₂O₃ | 18.1 | Na₂O | 4.1 | CuO | 0.006 |
| Al₂O₃ | 6.2 | Li₂O | 1.8 | Er₂O₃ | 0.25 |
| K₂O | 5.7 | Cl | 0.22 | Pd | 0.0002 |
| ZrO₂ | 5.0 | Br | 0.15 | | |

In order to investigate the utility of the inventive method with that glass, counterparts of Examples I and II above were conducted. Thus, Example III involved subjecting a group of lenses to the commercial "long" firing schedule, and Example IV employed the inventive schedule. Table II reports the color and photochromic properties demonstrated by the two sets of lenses in the same manner as presented in Table I.

TABLE II

|  | Example III | Example IV |
| --- | --- | --- |
| $T_o$ | 74.2 | 73.7 |
| $T_{D15}$ | 25.0 | 26.1 |
| $T_{F5}$ | 57.0 | 57.1 |
| $T_{F5}$-$T_{D15}$ | 32.0 | 31.0 |
| x | 0.4482 | 0.4461 |
| y | 0.4609 | 0.4614 |

This glass is illustrative of the phenomenon described by Borrelli et al. in U.S. Pat. No. 4,240,836. Thus, as they explained, when temperatures higher than about 450° C. are employed in the hydrogen firing reducing heat treatment, the glass will take on a yellow coloration. But, as can be observed from the above data, the present invention is equally effective at high temperatures. Hence, both the color and the photochromic behavior of the two sets of lenses are virtually identical.

Corning Incorporated produces yet another tinted silver halide-containing photochromic glass under the mark SERENGETI ® vermilion which is prepared by hydrogen firing Corning Code 8111 glass at a temperature of about 385° C. That glass, having the approximate composition below expressed in terms of parts by weight, is included within U.S. Pat. No. 4,832,724, supra.

| SiO₂ | 55.8 | Na₂O | 4.0 | Ag | 0.24 |
| --- | --- | --- | --- | --- | --- |
| Al₂O₃ | 6.5 | K₂O | 5.8 | Cl | 0.20 |
| B₂O₃ | 18.0 | ZrO₂ | 4.9 | Br | 0.13 |
| Li₂O | 1.9 | TiO₂ | 2.2 | CuO | 0.011 |

In order to determine the effectiveness of the inventive process with that glass, another series of experiments following the procedures of Example I and II was conducted. Accordingly, the series of Example V was subjected to the commercial "long" firing schedule and the series of Example Vi was exposed to the short firing schedule of the present invention. Table III reports the color and photochromic properties displayed by the two sets of lenses in like manner to those listed in Tables I and II.

TABLE III

|  | Example V | Example VI |
| --- | --- | --- |
| $T_o$ | 44.6 | 44.8 |
| $T_{D15}$ | 13.4 | 15.0 |
| $T_{F5}$ | 34.3 | 35.5 |
| $T_{F5}$-$T_{D15}$ | 20.9 | 20.5 |
| x | 0.3839 | 0.3867 |
| y | 0.2971 | 0.2976 |

Yet again, it is evident that both the color and the photochromic behavior of the two sets of lenses are essentially identical.

We claim:

1. In a method for producing a permanent coloration in an integral reduced surface layer on a photochromic glass article having a front surface and a back surface wherein silver halide crystals constitute the photochromic agent, which coloration is produced by heat treating said glass article in flowing hydrogen gas in a heat treating chamber at a temperature not exceeding about 500° C., the improvement comprising the steps of:
   (a) initially flowing hydrogen gas into said heat treating chamber at a sufficiently rapid rate to essentially instantaneously fill said chamber with hydrogen gas;

(b) immediately thereafter decreasing the flow of said gas to permit careful control of the rate at which reduction takes place in the glass surface; and (c) continuing that flow for a sufficient length of time to produce an integral reduced surface layer on both front and back surfaces of said glass article having a combined depth effective to exhibit a permanent coloration, but not of such individual depth as to prevent the passage of ultraviolet radiation through said front surface of said article.

2. A method according to claim 1 wherein said initial flow rate of hydrogen gas is about 20 ft$^3$/hour.

3. A method according to claim 1 wherein said initial flow rate of hydrogen gas is continued for no more than a few seconds.

4. A method according to claim 1 wherein said decreased flow rate of hydrogen gas is about 5 ft$^3$/hour.

5. A method according to claim 1 wherein the effective depth of said integral reduced surface layer ranges about 0.0005–0.003" ($\approx$0.013–0.075 mm).

6. A method according to claim 1 wherein said glass article is an ophthalmic multifocal lens.

7. A method according to claim 6 wherein said multifocal lens is a progressive power lens.

* * * * *

UNITED STATES PATENT AND TRADEMARK OFFICE
CERTIFICATE OF CORRECTION

PATENT NO. : 4,979,976
DATED : December 25, 1990
INVENTOR(S) : Thomas G. HAVENS/David J. KERKO It is certified that error appears in the above-identified patent and that said Letters Patent is hereby corrected as shown below:

PATENT
Col. 2, line 38, remove second % after 10%.

Col. 3, line 9, change "least" to read --heat--.

Col. 3, line 43, change "non-description" to --non-prescription--.

Col. 3, line 47, change "charge" to --change--.

Col. 4, line 13, change "rather" to --other--.

Col. 4, line 55, change "cf" to --of--.

Col. 6, line 52, delete "15".

Col. 8, line 14, change "&he" to --the--.

Col. 8, line 38, change "Vi" to --VI--.

Signed and Sealed this

Fourteenth Day of July, 1992

Attest:

DOUGLAS B. COMER

Attesting Officer    Acting Commissioner of Patents and Trademarks